Figure 1:
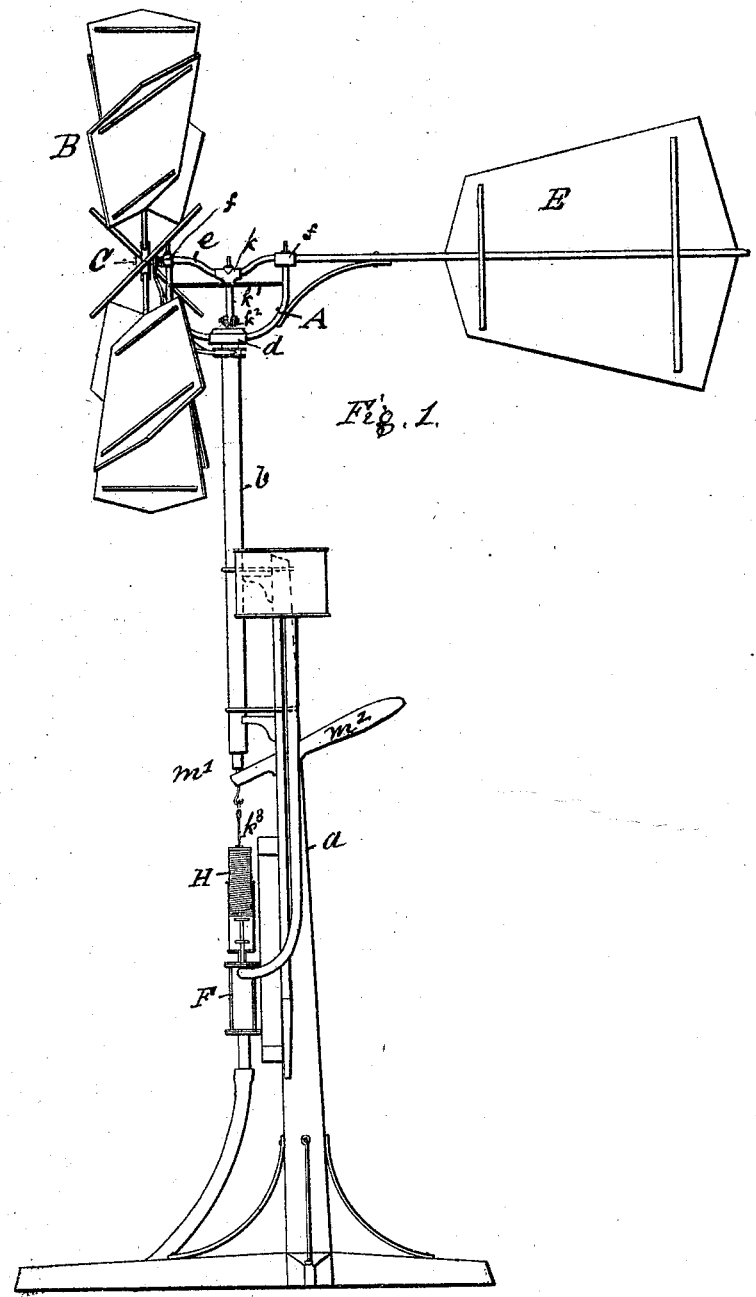

W. H. RICE.
Wind-Mills.

No. 150,714.

4 Sheets--Sheet 3.

Patented May 12, 1874.

W. H. RICE.
Wind-Mills.
No. 150,714.
Fig. 4.
Patented May 12, 1874.
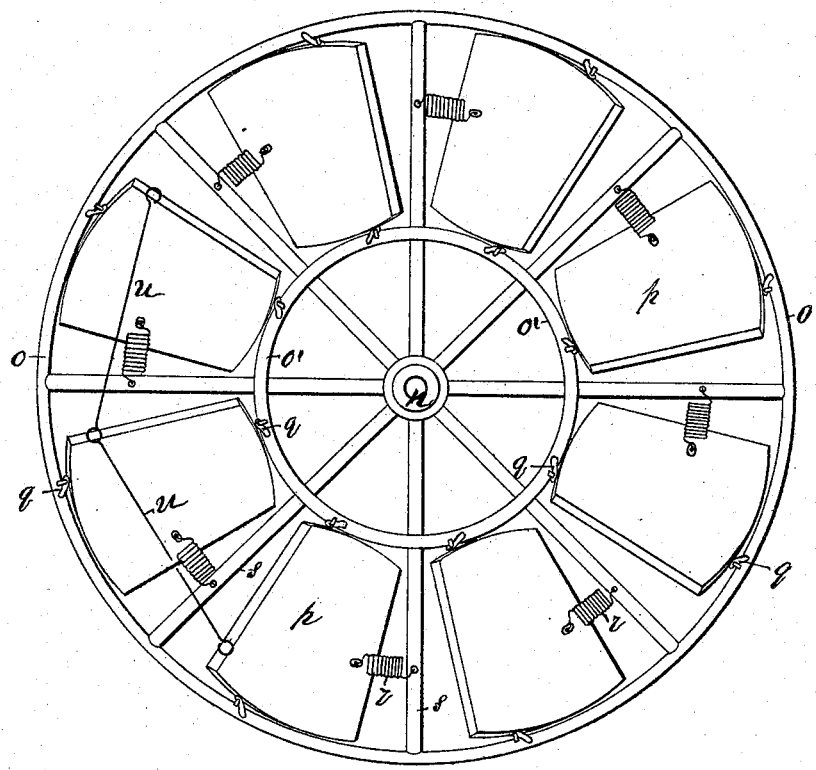
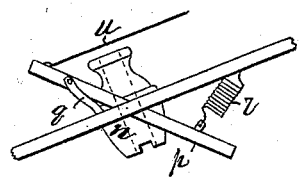

UNITED STATES PATENT OFFICE.

WAYNE H. RICE, OF EAST WINDSOR, CONNECTICUT.

IMPROVEMENT IN WINDMILLS.

Specification forming part of Letters Patent No. 150,714, dated May 12, 1874; application filed February 10, 1873.

*To all whom it may concern:*

Be it known that I, WAYNE H. RICE, of East Windsor, county of Hartford and State of Connecticut, have invented certain new and useful Improvements in Windmills; and, to enable others skilled in the art to make and use the same, I will proceed to describe, referring to the drawings, in which the same letters indicate like parts in each of the figures.

The nature of this invention consists in the peculiar construction thereof.

Figure 2:
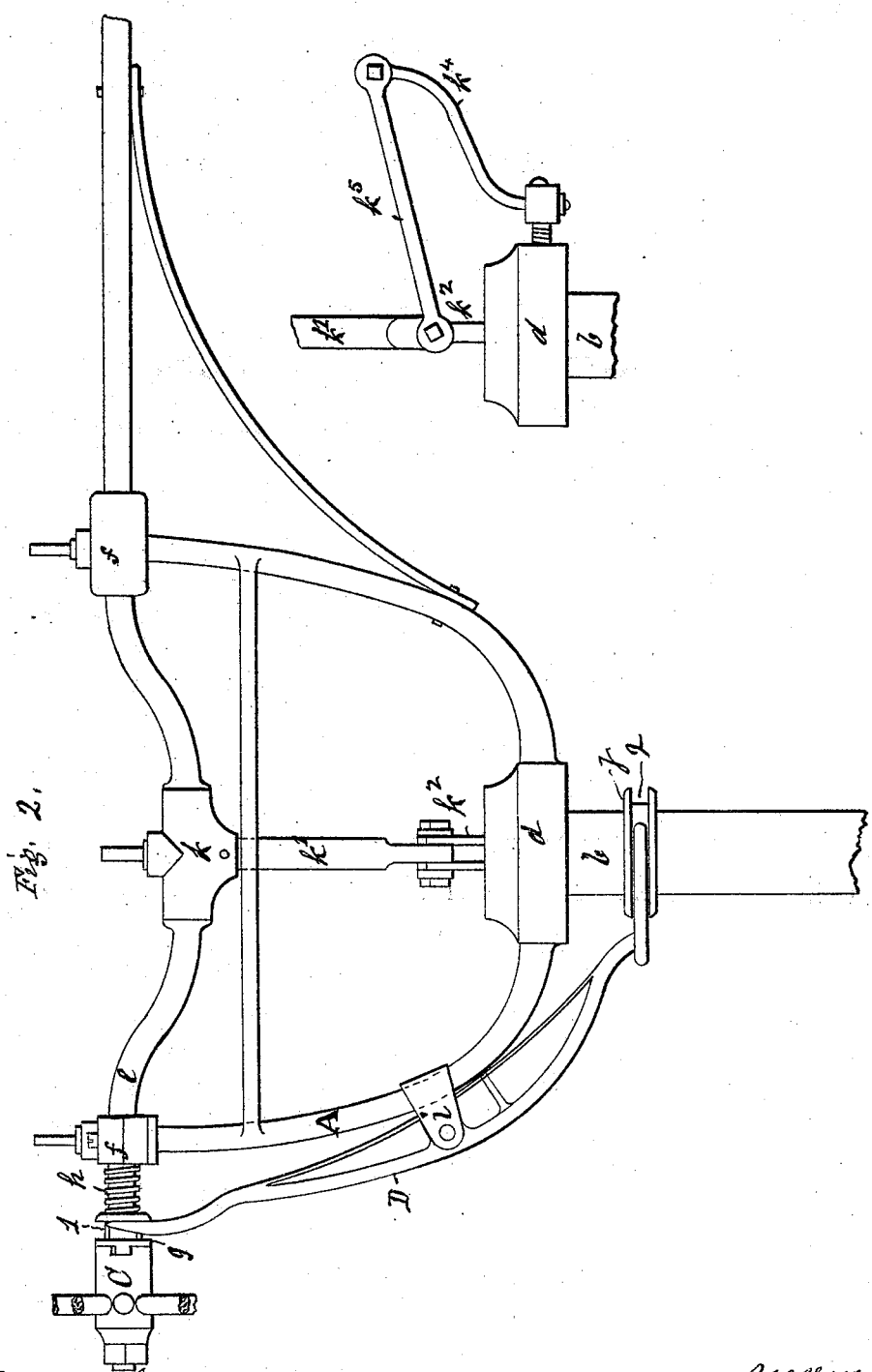
Figure 3:
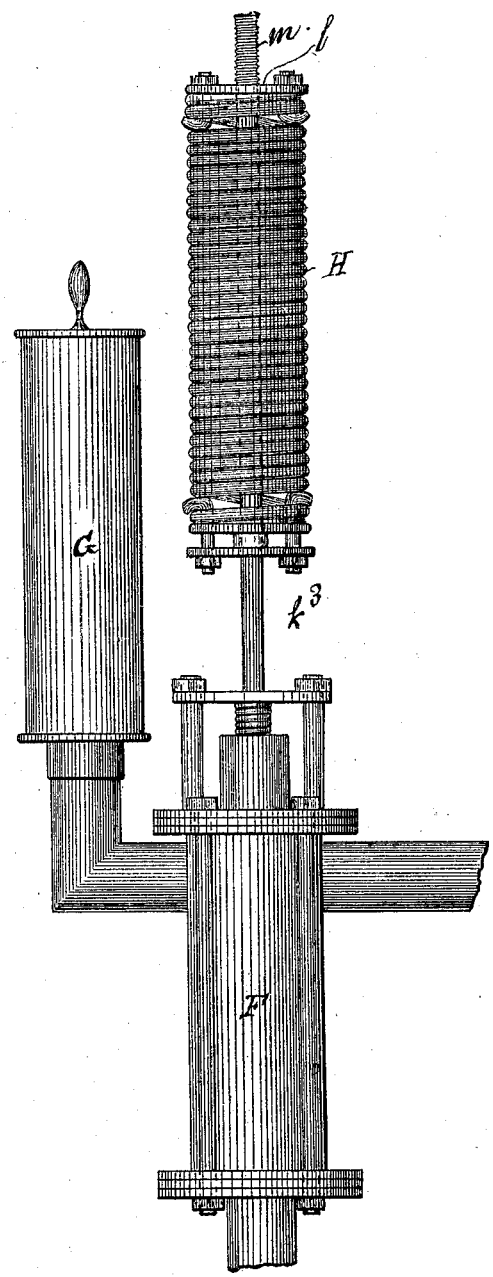

In the accompanying drawings, Figure 1 is a side elevation of this improvement. Fig. 2 is an enlarged detached view of the upper portion thereof. Fig. 3 is a detached view of the mechanism for raising water. Fig. 4 is a modified form of a wind-wheel, showing how the wind-surface plates are hung, and how they are rendered self-adjusting to the action of the wind, so that its speed shall be self-adjusting to the action of the wind, or according to the amount of power required.

A is a post or shaft, firmly secured in the ground in a perpendicular position, very much in the same way or manner of securing liberty-poles. $v$ is a tubular shaft, firmly secured, in a fixed position, to and near the upper end of the shaft $a$. A is a rotating wind-wheel frame, having a shaft fitted firmly into the hub $d$ of the frame-work, and extends downward to the end of the lever $m^2$, when desirable, and is fitted closely and turns freely inside of the shaft $v$ and supports the frame-work in its place, and allows it to turn freely therein. $e$ is a crank-shaft, fitted into bearings or boxes $f$ in such a manner that they may be easily and quickly adjusted. B is a wind-wheel, the hub C of which is fitted closely, and turns freely, upon the outer end of the crank-shaft $e$. $g$ is a clutch-sleeve fitted onto the crank-shaft just back of the hub C, so that the clutch shall, when desirable, move back and forth on said shaft for the purpose of connecting or disconnecting the clutch with the end of the hub C, and so that it can revolve only when the crank $e$ revolves. $h$ is a spring arranged on the crank-shaft, between the sleeve $g$ and the box $f$, the object of which is to aid the movement of the sleeve when it is desirable to make a connection with the hub. D is a forked clutch-lever secured by an arm, $i$, to the frame-work. The fork on the upper end of this lever plays in the groove 1 of the sleeve $g$, and the fork of the other end of the lever plays in a groove, 2, of the collar $j$, formed on the upper end of tubular shaft $b$. E is a rudder-plate, which serves to hold the wind-wheel before the wind, and is secured to the rear end or portion of the rotating frame in line with the crank-shaft. $k$ is a box fitted to the crank of the shaft $e$, having a pitman-arm, $k^1$, fitted thereto, and extending down and connects with the lifting-shaft, link, chain, or rod $k^2$, which passes down through the hollow shaft of the frame A, and connects with the pump piston-rod $k^3$. $k^4$ is a guide-arm, one end of which is connected to the joint of the pitman-arm $k^1$, and lifting-connections $k^2$, and the other end to a projecting arm, $k^5$, extending back from the hub $d$, the object of which is to hold the joint of the pitman-arm connections $k^2$ in nearly a perpendicular line while the upper end of the pitman-arm vibrates with the motion of the crank. E is a suction and force pump, constructed in the common way, and is secured to the shaft $a$ in a perpendicular position directly under and in line with the shaft $b$. G is an air-chamber arranged near the pump. H is a spring arranged around the pump-piston rod, one end of which is secured in a fixed position to the shaft $a$, while the tension of the spring is regulated by a screw-nut placed directly under the cap-plate $l$ and upon the threaded surface $m$ of the piston-rod $k^3$, the object of which is to quickly react the pump-piston downward after having been lifted by the crank motion, so that a cord or link chain may be used to form the connection in place of a rigid connection. $m^2$ is a hollow spindle fitted into the lower end of the tubular shaft $b$, and extending up to the lower end of the shaft of the frame-work A, and the lower end is held in place and is actuated by the lever $m^2$. Now, by the action of this lever $m^2$ through the hollow shaft $m^1$ against the lower end of the shaft of the frame A, the frame, with its mechanism, may be elevated, and through the joint action of the lever D, clutch $g$, spring $h$, a connection will be formed of the wind-wheel and the crank-shaft, so that, by raising or lowering the lever $m^2$ the wheel and crank-shaft may be connected and disconnected at pleasure. In Fig. 4, $n$ is a hub of a wind-wheel; $o$ $o'$, the rims between which the wind-plates $p$ are arranged, and are hinged to arms $q$, which extend outward from the rims $o\ o'$. Said plates or wind-surfaces are adjusted to the action of the wind by springs $r$, one end being secured to the wheel-arms $s$, and the other to the edge or face of the plates $p$.

I propose sometimes to connect the edges of the plates $p$ by means of link and staple, as shown at $u$.

It will be seen that a large portion or all of this machine may be made of sheet metal, metal tubing, rods, &c., whereby the machine will be cheaper, lighter, stronger, more durable, and easy of manufacture.

I believe I have described the nature and construction of this improvement, so as to enable a person skilled in the art to make and use the same therefrom.

I claim—

1. A wind-wheel, having projecting arms $q$ extending from the rims $o\ o'$, between the ends of which the outer ends or fulcrum bearings of the wind-plates $p$ are hinged, having graduating-springs $r$, with or without the connecting links $u$, substantially as and for the purpose set forth.

2. The combination of the frame-work A, shaft $b$, crank-shaft $e$, wheel B, rudder E, forked lever D, clutch $g$, actuating collar $j$, shaft $m$, and lever $m^2$, substantially as and for the purpose set forth.

3. In combination with the crank-shaft $e$, jointed pitman-arm $k^1$, lifting-connection $k^2$, guide-arm $k^5$, hollow shaft or fulcrum-rod, of the hub $d$, substantially as and for the purpose set forth.

WAYNE H. RICE. [L. S.]

Witnesses:
EZRA CLARK,
JEREMY W. BLISS.